US006978553B2

(12) United States Patent  (10) Patent No.: US 6,978,553 B2
Doublet  (45) Date of Patent: Dec. 27, 2005

(54) RIGHT ANGLE MEASURING DEVICE

(76) Inventor: Daniel P. Doublet, Route du Sap, F-14100 Beuvilliers (FR)

( * ) Notice: Subject to any disclaimer, the term of this patent is extended or adjusted under 35 U.S.C. 154(b) by 0 days.

(21) Appl. No.: 10/476,325

(22) PCT Filed: Apr. 27, 2002

(86) PCT No.: PCT/FR02/01474

§ 371 (c)(1),
(2), (4) Date: May 6, 2004

(87) PCT Pub. No.: WO02/088626

PCT Pub. Date: Nov. 7, 2002

(65) Prior Publication Data

US 2005/0072009 A1  Apr. 7, 2005

(30) Foreign Application Priority Data

Apr. 29, 2001 (FR) .................................. 01 06421
Apr. 26, 2002 (FR) .................................. 02 05288

(51) Int. Cl.$^7$ .............................................. G01B 3/10
(52) U.S. Cl. ............................. 33/756; 33/1 G; 33/769
(58) Field of Search ........................... 33/1 G, 755, 756, 33/759, 770, 757, 769

(56) References Cited

U.S. PATENT DOCUMENTS

| 464,205 | A | * | 12/1891 | Swope | 33/756 |
| 1,240,498 | A | * | 9/1917 | Sherwood | 33/755 |
| 4,160,324 | A | * | 7/1979 | Dunn | 33/759 |
| 4,381,607 | A | * | 5/1983 | Place | 33/1 G |
| 4,575,943 | A | | 3/1986 | Baum Jr. | |
| 4,779,212 | A | * | 10/1988 | Levy | 33/755 |
| 5,107,595 | A | * | 4/1992 | Stay et al. | 33/1 G |
| 5,371,949 | A | * | 12/1994 | Delaurier | 33/1 G |
| 5,519,940 | A | * | 5/1996 | Brondfield | 33/1 G |
| 5,928,095 | A | * | 7/1999 | Aldstadt | 33/759 |
| 6,141,880 | A | * | 11/2000 | Vircks | 33/1 G |
| 2002/0088133 | A1 | * | 7/2002 | McMillan | 33/756 |

FOREIGN PATENT DOCUMENTS

| CA | 2 108 989 | 4/1995 |
| FR | 1 300 851 | 8/1962 |
| FR | 1 572 287 | 6/1969 |

* cited by examiner

Primary Examiner—G. Bradley Bennett
(74) Attorney, Agent, or Firm—Westman, Champlin & Kelly (57) ABSTRACT

The invention concerns a device comprising a flexible and non-elastic yarn divided by at least three retaining means fixed to predetermined locations and at least three fixing means adapted to support the retaining means and whereof the diameter of each fixing means is substantially equal to the internal diameter of the retaining means so as to position the yard along a direction perpendicular to that of the axis of the corresponding fixing means.

21 Claims, 7 Drawing Sheets

RIGHT ANGLE MEASURING DEVICE

CROSS-REFERENCE TO RELATED APPLICATION

This Application is a Section 371 National Stage Application of International Application No. PCT/FR02/01474 filed Apr. 27, 2002 and published as WO 02/088626 on Nov. 7, 2002, not in English.

FIELD OF THE INVENTION

Device designed to materialise limits perpendicular to existing or future limits, useable particularly in building, construction or do-it-yourself work.

The purpose of this invention is a device designed to materialise limits perpendicular to existing or future limits, particularly for building or construction work, do-it-yourself work, etc.

BACKGROUND OF THE INVENTION

This device is designed firstly for use by do-it-yourself enthusiasts and amateur gardeners, for example, and also for professionals such as brick layers, tilers, electricians, carpenters, roofers, gardeners, landscape artists, etc.

In the context of their activities, these persons are frequently confronted with the problem that consists of materialising limits that are perpendicular to other existing or future limits, for example for the construction of a house, a veranda, a fence, plantation, structure, etc.

For individuals, "bricklayer" right angle measuring devices are available composed of two flat bars welded together forming an angle of 90 degrees to each other. These right angle measuring devices do not resist shocks and are only precise for small dimensions (less than 2 meters).

Amateur gardeners cannot make good use of this instrument which is not suitable for surfaces such as lawns, gardens, and alleys. Without appropriate means, these persons usually work "by eye".

Professionals have three solutions:

1) The bricklayer's right angle measuring device, with the limits and disadvantages mentioned above.

2) The "3, 4, 5" method which is nothing more than application of Pythagoras's principle of a right angled triangle, by which the square of the hypotenuse is equal to the sum of the squares of the other two sides (3×3+4×4= 5×5).

This process has the advantage of excellent precision, but its use is old-fashioned, painstaking, complicated and requires the participation of two persons together with a measuring instrument (ten-meters rule). Furthermore, the fact that three precise measurements have to be made, frequently under poor conditions, introduces a risk of error.

3) The theodolite, a very precise but very expensive and fragile instrument that requires difficult and complex operations for use.

These known means are not adapted to the demand and to needs. Thus, plumbers have to compensate for out-of-square distances of several centimeters over the width of a bath, and tilers frequently observe differences of more than 10 cm in a single room, even in new constructions.

Therefore, the purpose of the invention is to divulge a device that solves the problem simply, quickly, with excellent precision even over long distances (several tens of meters) without any complex or expensive means and without any risk of error.

SUMMARY OF THE INVENTION

According to the invention, the device designed to materialise limits perpendicular to existing or future limits, particularly for building or construction or do-it-yourself work, comprises a flexible and inelastic yarn divided by at least three retaining means fixed to predetermined locations, and at least three fixing means adapted to support the retaining means and in which the diameter of each fixing means is substantially equal to the inside diameter of the retaining means so as to position the yarn along a direction perpendicular to the direction of the axis (XX) of the corresponding fixing means.

The device according to this invention comprises a flexible and inelastic yarn divided by rings to form strands, at least three rings fixed on this yarn at predetermined locations starting from one end of the yarn, a predetermined length of yarn remaining free beyond the third location, and at least three plugs adapted to support the rings and the diameter of each plug being substantially equal to the inside diameter of the rings so that the yarn can be positioned along a direction perpendicular to the direction of the axis (XX) of the corresponding plug, the fixing locations of the rings on the yarn being chosen such that when the yarn is tensioned between the rings, the length of the yarn remaining is free to form a first end of a right angled triangle in which the hypotenuse and the third side are defined by the two distances between the first and second fixing locations and between the second and third fixing locations.

The device according to this invention comprises a housing in the form of a right angled triangle, at least one winder guided in rotation inside the housing, at least one flexible and inelastic yarn, at least three retaining means fixed on the yarn at predetermined locations starting from one end of the yarn, and at least three fixing means adapted to support the corresponding retaining means.

The device according to this invention is composed of a housing in the shape of a right angled triangle comprising a winder guided in rotation and on which a flexible and inelastic yarn is wound arranged in a loop.

The device according to this invention is composed of a housing in the shape of a right angled triangle, with three winders inside the housing being guided in rotation a flexible and inelastic yarn is wound around these winders, the said winders being able to completely come out of the housing in order to form the ends of the sides of the right angle of the housing, while the lengths of the three lengths of flexible, inelastic yarn that connect the winders in pairs are calculated such that when they are tensioned and in contact with their stops, they form a perfect right angled triangle materialised both by the tensioned yarn and by pegs or headless nails passing through the retaining means fixed to the said yarn.

Thus, the right angled triangle is formed by firstly unwinding the yarn fitted with its rings and placing them on the corresponding plugs, the end of the yarn beyond the third location is connected to the opposite end of the yarn to materialise the vertex of the right angle, and the yarn is tensioned between the three rings.

All other characteristics of the invention are described in the secondary claims.

BRIEF DESCRIPTION OF THE DRAWINGS

Other specific features and advantages of the invention will become clear after reading the following description of several embodiments of the invention with reference to the attached drawings on which.

DETAILED DESCRIPTION OF THE PREFERRED EMBODIMENTS

Figure 1:
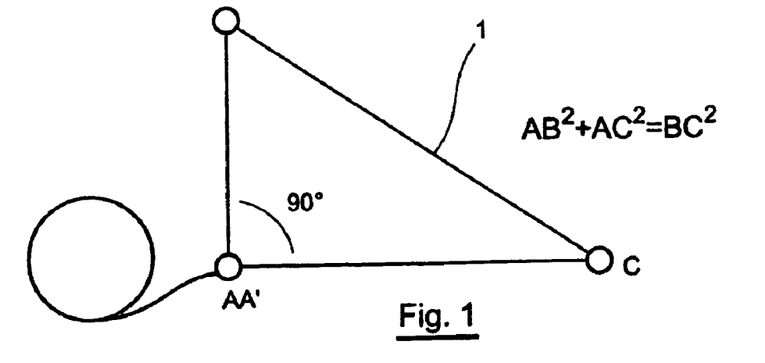
FIG. 1 is a diagrammatic plane view of a right angled triangle illustrating a first embodiment of the device according to the invention.
Figure 2:
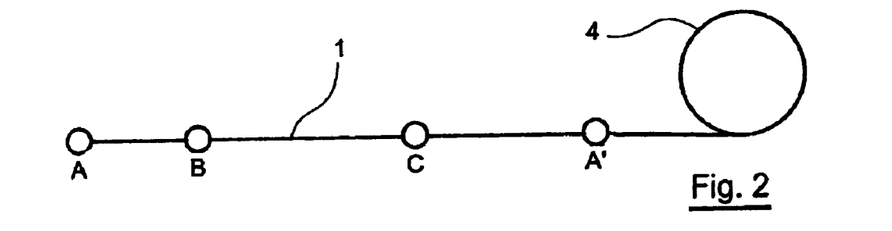
FIG. 2 is a diagrammatic view showing a longitudinal elevation of the device in FIG. 1 with the yarn entirely unwound and slack, before the right angled triangle is formed.
Figure 3:
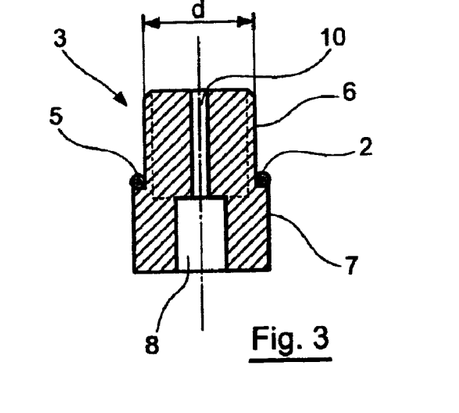
FIG. 3 is an axial sectional view of a plug fitted with its ring, according to a first possible embodiment.
Figure 4:
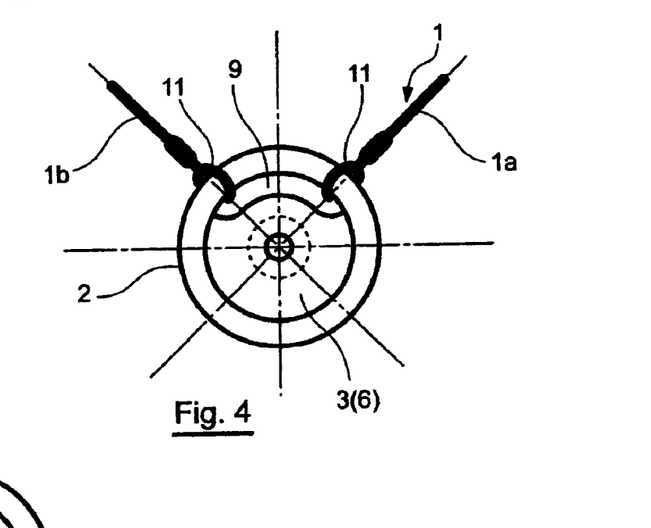
FIG. 4 is a top view corresponding to FIG. 3.

The device shown diagrammatically in FIGS. 1 and 2 comprises a flexible and inelastic yarn 1, three rings such as the ring 2 visible in FIGS. 3 and 4 fixed on the yarn at predetermined locations A, B, C from one end of the yarn, and three plugs such as plug 3 in FIGS. 3 and 4, adapted to support the corresponding rings.

Beyond the third fixing location C, the yarn extends over a determined free length CA', with a terminal segment fixed to a plug of a winder 4.

The ring fixing locations A, B, C are chosen such that after fixing the point A' to location A and after formation of a loop of yarn, the yarn can materialise the right angled triangle ABC when it is tensioned between locations A, B and C.

The length of yarn CA' then forms a first side of the triangle, for which the hypotenuse BC and the third side AB are defined by the distances between the locations AB and BC at which rings are fixed.

A fourth ring can advantageously be fixed at A' so that the first ring fixed at A can be superposed. The rings 2 can be fixed to the yarn 1, for example by crimping.

The right angled triangle A(A'), B, C thus formed satisfies Pythagoras's relation:

$$AB^2 + AC^2 = BC^2 \text{ or } A'B^2 + A'C^2 + BC^2$$

In order to form the triangle ABC from the unwound triangle as illustrated in FIG. 2, all that is necessary is to superpose and clip the rings 2 of A and A' together on a plug 3, to clip the ring 2 of B onto a second plug 3 and to clip the ring 2 of C onto a third plug 3, and finally to tension the yarn 1 between the three plugs 3. The result is thus a right angle at A.

The plugs 3 are made such that their axis XX can be perfectly aligned with the yarn 1 to materialise the three vertices A, B, C of the right angled triangle at A, while the tensioned yarn 1 materialises the three sides of the same triangle, therefore by intersecting the axes XX of the plugs 3. If necessary, users can prolong the sides of the triangle ABC with an ordinary string, while maintaining excellent precision.

Therefore, the major advantage of this invention is to quickly obtain a right angle at a determined location (A) without any risk of error, with excellent precision and easy to use means.

In the embodiment in FIGS. 3 and 4, each ring 2 is circular on the outside and on the inside and it is sized so that it can fit onto each corresponding plug 3, for which the diameter d is substantially equal to the inside diameter of the ring 2. This diameter d is the diameter of a cylindrical part 6 of the axis XX prolonged by a transverse shoulder 5 forming a thrust step for the ring 2.

This step is connected to a cylindrical part 7 with a diameter greater than d, in which an axial hole 8 is formed prolonged by a reaming 10 opening up at the free end of the part 6. The hole 8 is used to fix the plug 3 onto a support for example such as a metallic peg, or a headless nail that penetrates into the reaming 10.

This nail is used to attach the plug 3 onto a hard surface, and plugs fitted on these nails can be removed while the nails remain in place and materialise the right angled triangle.

An angular window 9 is formed on plug 3, delimiting an angular clearance between the ring 2 and the plug 3 enabling precise positioning of the yarn 1 in a direction perpendicular to the XX axis of the plug 3.

Consequently, each strand 1a and 1b of the yarn attached to ring 2 is fitted with a terminal loop 11 wound onto the ring that it surrounds (FIG. 4) penetrating into the clearance 9, which advantageously extends over an appropriate angular sector, preferably more than 90 degrees.

Consequently, the strands 1a and 1b of the yarn can materialise a right angle or an angle less than 90 degrees, while remaining exactly perpendicular to the XX axis of the plug 3.

Figure 5:
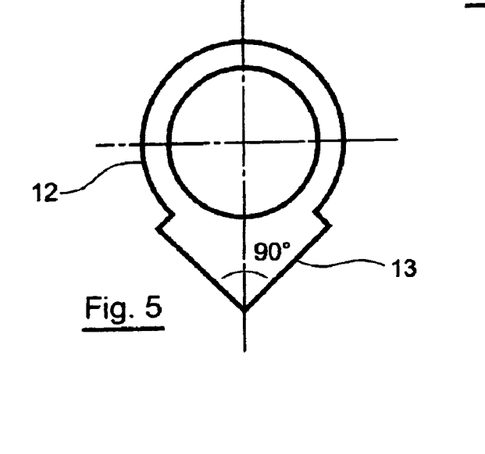
FIG. 5 is a top view of a second embodiment of the ring.
Figure 7:
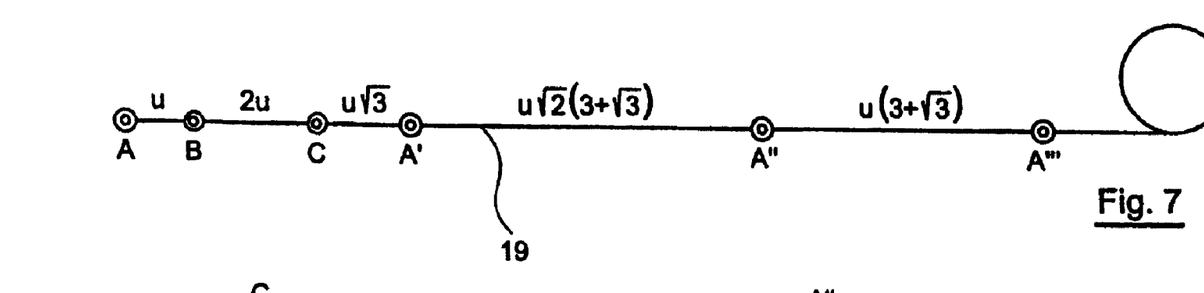
FIG. 7 is a diagrammatic elevation view showing a second possible embodiment of the device according to the invention, after being fully unwound as shown in FIG. 2.

In the variant in FIG. 5, the ring 12 delimits a peripheral shape 13 configured so as to define a characteristic angle or a right angle in the yarn 1 (or 19 in FIG. 7). This value may be mentioned on the shape 13 as represented. In this special case (right angle), the ring 12 is adapted to materialise the position A of the right angle.

Figure 6:
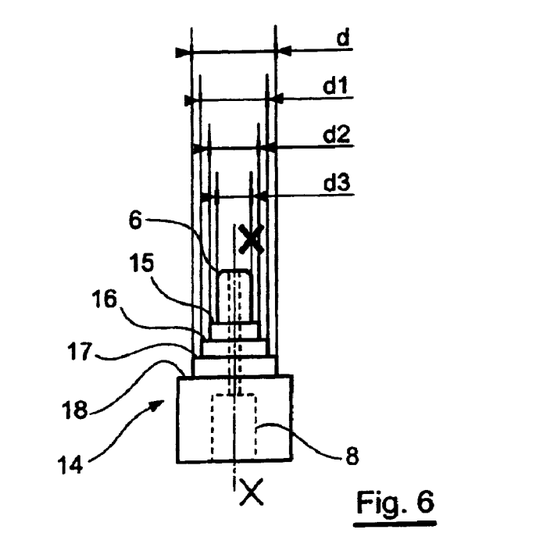
FIG. 6 is an elevation view of a second embodiment of a plug fitted on the device.

In the embodiment shown in FIG. 6, the plug 14 comprises several annular shoulders 15 to 18 with increasing diameter (d3, d2, d1, d). These shoulders form concentric stages which can hold rings with dimensions corresponding to right angled triangles with different complementary angles, or with dimensions adapted to the application considered.

In other embodiments, the device comprises, sets of rings of different colours and/or diameters. These rings are fixed to the yarn at locations at appropriate spacings, such that there is a right angled triangle with determined complementary dimensions and angles, for each different set of colours and/or given diameter.

Figure 8:
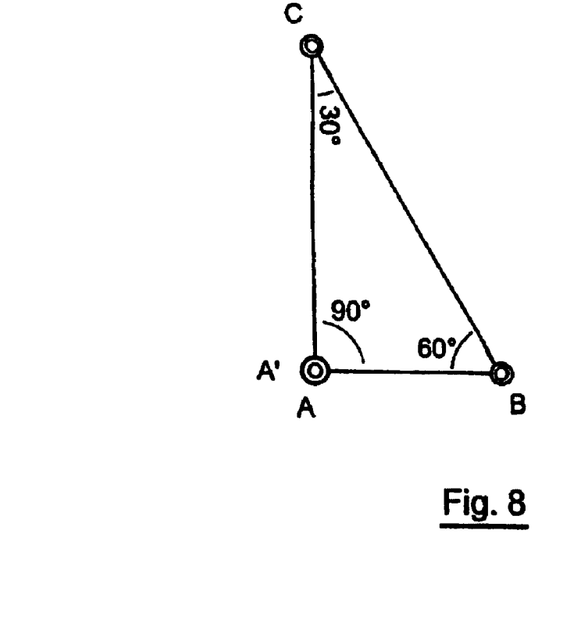
FIGS. 8 and 9 show two right angled triangles with different characteristic angles, that can be obtained using the device in FIG. 7.
Figure 9:
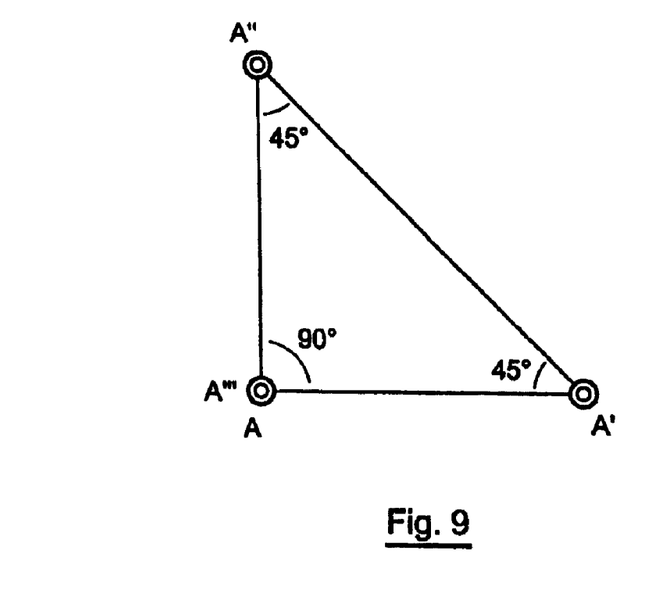

Thus FIG. 7 shows a device with yarn 19 on which there are two rings A" and A''' fixed beyond the first four rings A, B, C and A' at distances calculated so that it is possible to make a right angled triangle either with the first four rings ABCA' with complementary angles of 30 degrees at C and 60 degrees at B (FIG. 8), or using the first ring A and the last three rings (A', A" and A''') to form a right angled triangle with complementary angles at A" and A' of 45 degrees each (FIG. 9).

Consequently, the centre-to-centre distances of the different positions are mathematically determined as follows:

$$AB=u;\ BC=2u;\ CA'=u\sqrt{3};\ A'A''=u\sqrt{2(3+\sqrt{3})}$$

$$A''A'''=u(3+\sqrt{3})$$

Rings A, A', A" and A'" have large diameters and rings B and C have smaller diameters.

The large diameter rings A and A' are superposed and rings B and C are pulled to obtain the triangle in FIG. 8. In this triangle:

$$AB=u\ \text{and angle}\ A=90\ \text{degrees}$$

$$BC=2u\ \text{and angle}\ B=60\ \text{degrees}$$

$$CA=u\sqrt{3}\ \text{and angle}\ C=30\ \text{degrees}$$

Now, if the large diameter rings A and A'" are superposed and the rings A' and A" are then tensioned, the right angled triangle shown in FIG. 9 is obtained and in this case we have:

$$AA'=u(3+\sqrt{3})\ \text{and angle}\ A=90\ \text{degrees}$$

$$A'A''=u\sqrt{2(3+\sqrt{3})}\ \text{and angle}\ A'=45\ \text{degrees}$$

$$A''A'''=u(3+\sqrt{3})\ \text{and angle}\ A''=45\ \text{degrees}$$

It can be seen that sets of rings of different colours and/or shapes or different diameters can be arranged on the yarn so as to define right angled triangles with different complementary angles, and particularly with different characteristic angles (30, 60 and 45 degrees) and different dimensions.

Sets of rings of a given colour may be adapted to applications in a small space (inside a building, garden or other spaces) while rings with different colours or different shapes can materialise a right angle and other characteristic angles in larger spaces (buildings, swimming pools, tennis courts and other spaces).

Rings 2 and 12 associated with plug 14 in FIG. 6 may correspond to right angled triangles with different complementary angles (for example 60 and 30 degrees or 45 and 45 degrees), or appropriate dimensions depending on whether it is required to plot the right angle in a limited space or in a large space.

The invention also covers various manufacturing embodiments; thus, for example A' may be made in the form of any equivalent of a ring such as a hook, a snap fastener or a small diameter eyelet.

A' may also be fixed, for example by crimping, onto ring A, the yarn thus forming a loop. The plugs described may be replaced by pegs onto which rings are placed and that perform the same function.

Figure 10:
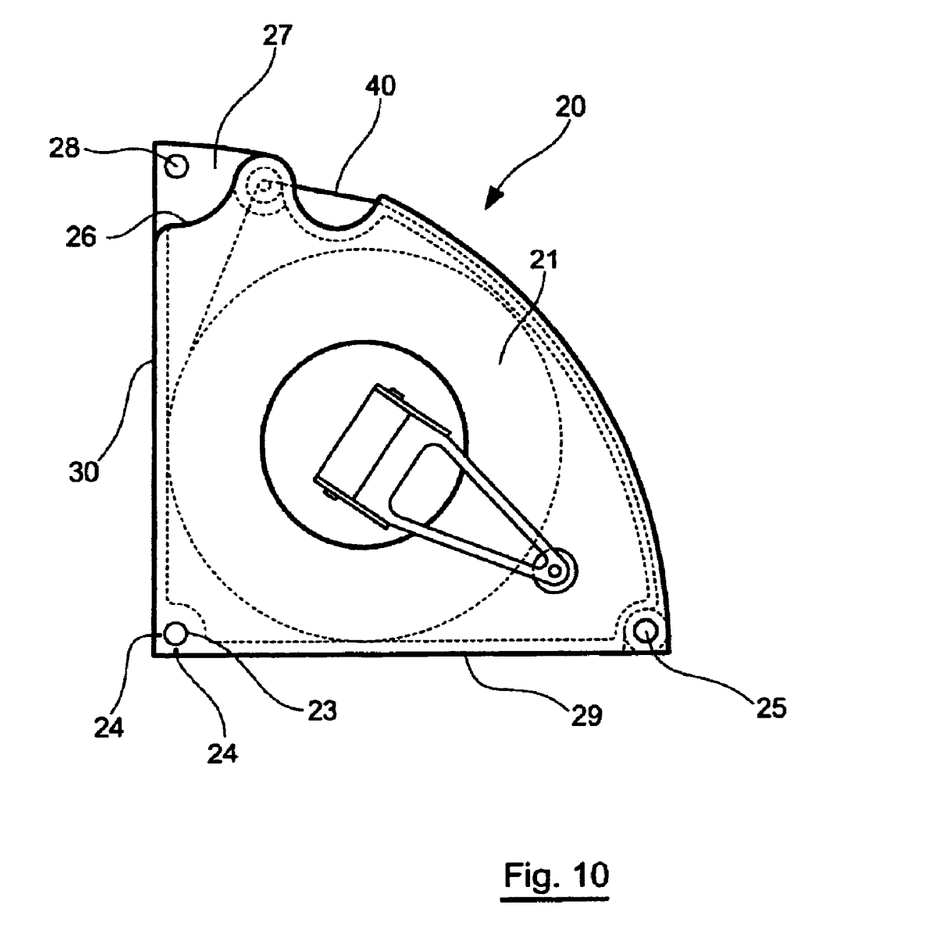
FIGS. 10 and 11 show a first example embodiment of the device according to this invention.
Figure 11:
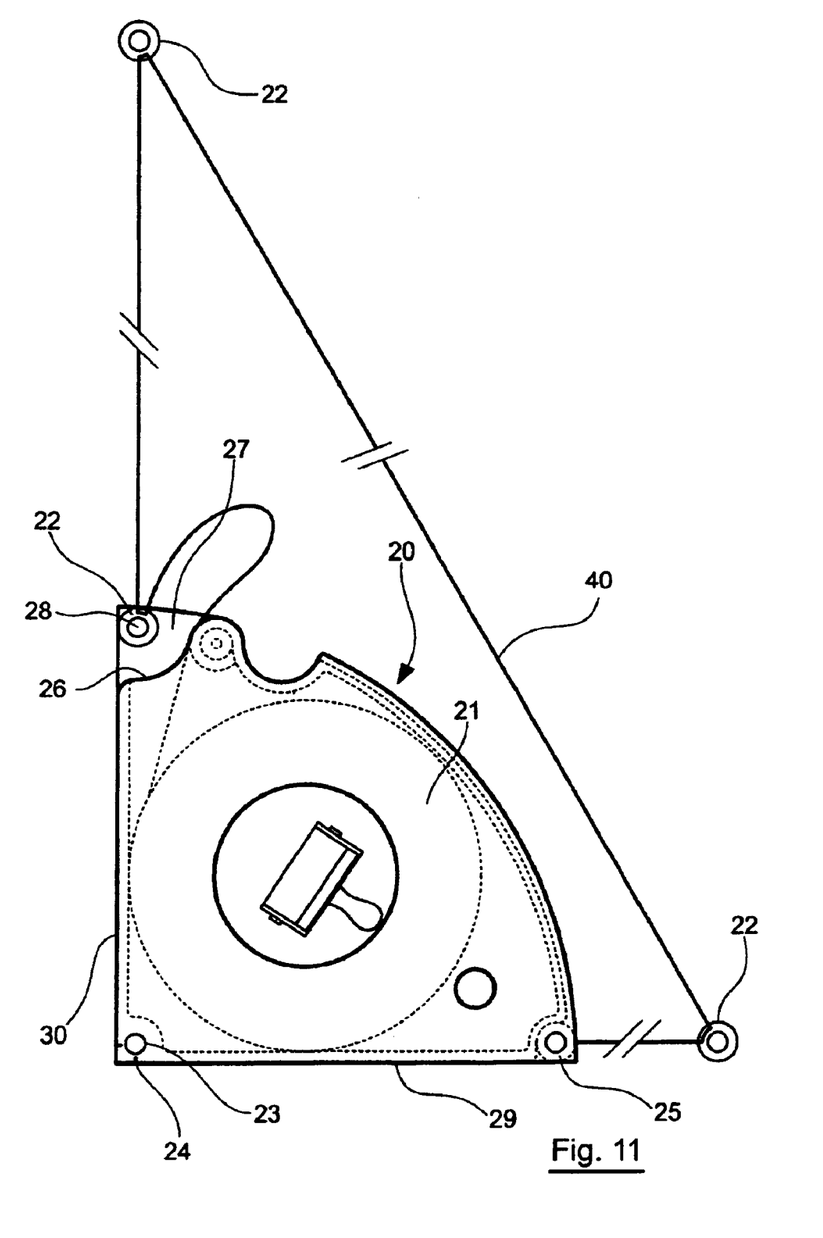

FIGS. 10 and 11 show an example embodiment of the device according to this invention, designed to materialise limits perpendicular to existing or future limits.

The device according to this invention comprises a housing 20 in the shape of a right angled triangle comprising a first straight edge 29 and a second straight edge 30 perpendicular to the first straight edge. A winder 21 is placed inside the housing 20 in its internal part guided in rotation, and a flexible and inelastic yarn 40 arranged in a loop is wound onto a winder.

One or several sets of three eyelets 22 forming small rings similar to those described above are crimped onto the flexible yarn 40. The eyelets 22 are crimped onto the yarn such that when the device is in position, the tensioned yarn is aligned perfectly with the centre line of the eyelets 22.

Each set of three eyelets 22 is identified by a different colour to materialise a right angled triangle with a different dimension.

For example, a 2 m×2 m right angled triangle is obtained using the yellow eyelets; a 5 m×5 m right angled triangle is obtained using the red eyelets; 10 m×10 m using the blue eyelets; 20 m×20 m using green eyelets, etc.

A hole 23 is drilled in the housing 20 at the vertex of the right angle to keep it in position with a peg or a headless nail, not shown. There are two marks 24 provided on the housing 20 and at the vertex of the right angle, materialising the alignment of the tensioned yarn 40.

The yarn 40 is crimped to the winder 21 at one of its ends, while the other end is crimped free to move around a pin 25 fixed to one of the ends of the housing 20 forming one of the sides of the right angle. Thus, the end of the yarn 40 is fixed to the housing 20 to form a yarn loop.

The yarn 40 winds in and out around the winder 21, passing through a window 26 located at the other end and around the periphery of the housing 20. This window 26 also allows the eyelets 22 to pass through when the device is being put into place.

The third eyelet 22 of each set is attached to another pin 28 near the window 26 at a recess 27 formed in the housing 20.

Note that the hole 23 and the pins 25 and 28 of the housing 20 form a right angle at 23. The eyelets 22 in each set are crimped on the yarn 40 at distances such that when the device is in place, it defines a large right angled triangle, for example with characteristic complementary angles (45°, 30°, 60°).

Thus, it is simple to use the housing 20 forming the device according to this invention.

Example Use

Draw the perpendicular to a straight line D at a point P with a 2 m×2 m right angled triangle.

Place the hole 23 of the housing 20 at P and use a plug or a headless nail or a peg to hold it in place.

Unwind and tension the yarn 40 along the straight line D as far as the first yellow eyelet 22 and fix it in place using a plug or a headless nail or a peg.

Unwind the yarn 40 as far as the third yellow eyelet 22 and fix it to the pin 28 in the housing 20.

Take the second yellow eyelet 22 and tension the two strands or yarn 40 that connect it to the first and third eyelets 22.

Fix the second eyelet 22 using a plug or a headless nail or a peg to obtain the perpendicular to the straight line D at point P, materialised by the tensioned yarn 1 and by the pegs or headless nails.

All that is necessary to obtain a 5 m×5 m, 10 m×10 m or 20 m×20 m right angled triangle is to proceed in the same manner using the red, blue or green eyelets respectively.

As an alternative, the housing 20 may be provided with a winder 21 and a single right angled triangle dimension, in other words a single set of three eyelets 22. In this case, the third eyelet 22 and the pin 28 can be eliminated. However, the window 26 will be arranged such that the yarn 40 is guided at the pin 28 so that a right angle can be obtained directly when the yarn 40 is completely extended.

Figure 12:
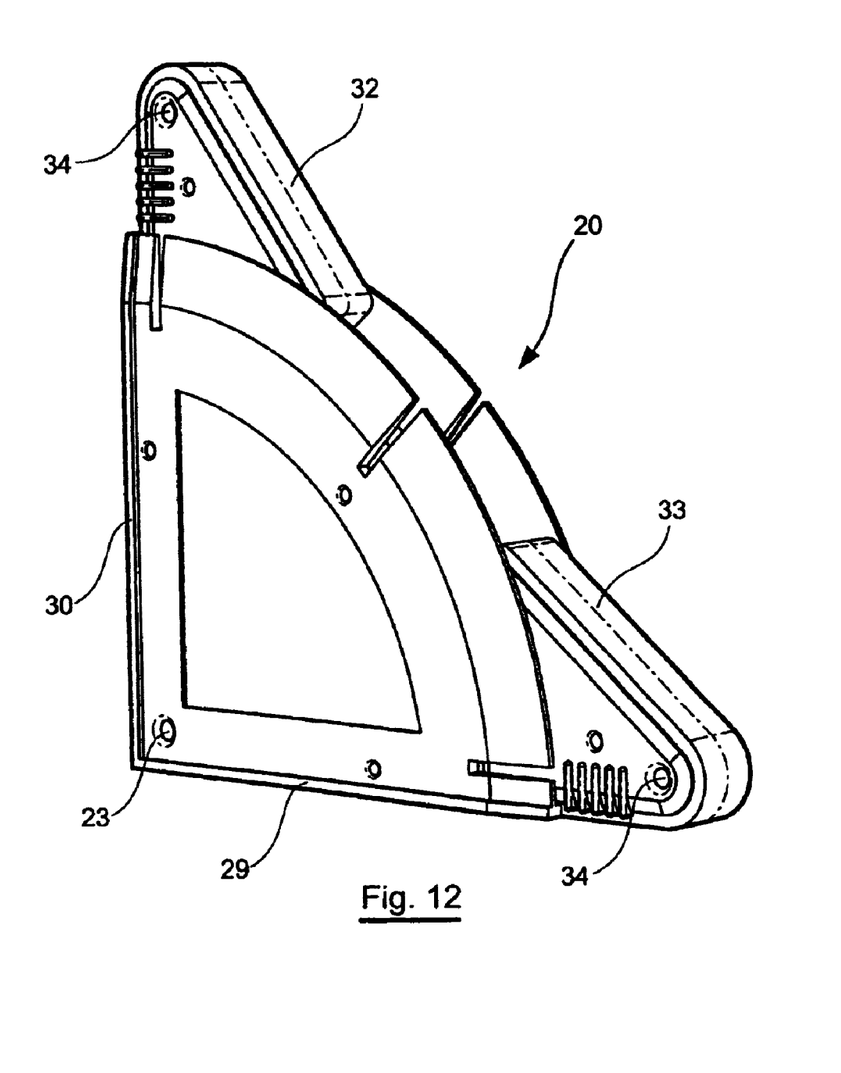
FIGS. 12 and 13 show a second example embodiment with three winders of the device according to this invention.
Figure 13:
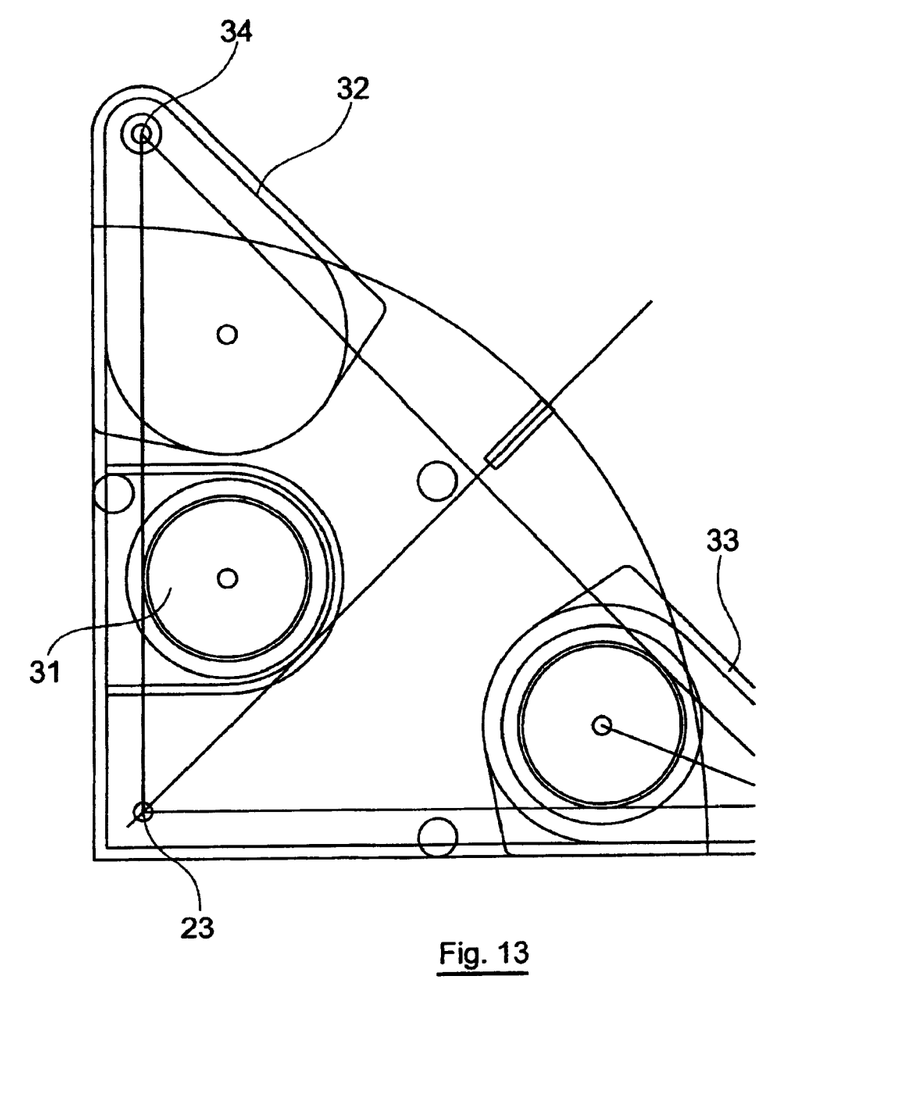

FIGS. 12 and 13 show a second embodiment of the device according to this invention composed of a housing 20 in the form of a right angled triangle inside which three winders 31, 32 are 33 are guided in rotation and around which a flexible and inelastic yarn is wound.

The winders 32 and 33 are designed so that they can come out of the housing 20 and form the ends of the sides of the right angle of the housing. Consequently, when at rest, the winders 32 and 33 are arranged and retained inside the housing 20.

There is a hole 34 in the winders 32 and 33, similar to the hole 23 formed in the housing 20, to enable the housing 20 to remain in position by means of headless nails or pegs not shown.

The winder 31 of the housing 20 is connected to the mobile winder 32 by a flexible and inelastic yarn 40.

The winder 32 is connected to the mobile winder 33 through a flexible and inelastic yarn similar to that in 40.

The winder 33 is connected to the housing 20 through a flexible and inelastic yarn similar to that in 40.

Example Use

Draw the perpendicular to a straight line D at a point P using the housing 20 in the form of a right angle measuring device with three winders.

Place the hole 23 of the housing 20 at P and use a headless nail or a peg to hold it in place.

Take the winder 32 out of the housing 20 and hold it in place on the straight line D using a plug or a headless nail or a peg passing through the hole 34. At the same time as the winder 32 comes out of the housing 20, the yarn in the winder starts to unwind and continues until it reaches a stop.

Take the winder 33 out of the housing 20 and hold it in position using a plug or a headless nail or a peg passing through the hole 34. At the same time as the winder 33 comes out of the housing 20, the yarn of the winders 32 and 33 unwinds until they reach the stop.

Note that the tensioned yarn between the mobile winder 33 and the housing 20 is perpendicular to the straight line D at P.

Note that the lengths of each of the three flexible and inelastic pieces of yarn that connect two of the winders 31, 32, 33 are calculated such that when they are tensioned and have reached the stop, they form a perfect right angled triangle materialised by the tensioned yarn and by the pegs or headless nails passing the eyelets 22 in the said yarn.

In general, the outside diameters of the retaining means 2, 12 and 22 are in line with the straight edges 29 and 30 of housing 20.

The outside edges of the winders 32 and 33 in the open position are also in line with the straight edges 29 and 30 of the housing 20.

It must also be understood that the above description only includes examples and in no way limits the scope of the invention, which also includes embodiments in which construction details are replaced by any equivalent details.

What is claimed is:

1. A device designed to materialize limits perpendicular to existing or future limits, comprising a housing in the form of a right angled triangle, at least one winder guided in rotation inside the housing, at least one flexible and inelastic material divided by at least three retaining means fixed at predetermined locations, and at least three fixing means adapted to support the retaining means, the diameter of each fixing means being substantially equal to the an inside diameter of the retaining means so as to position the material along a direction perpendicular to the direction of an axis of the corresponding fixing means, the housing comprising a hole at the vertex of the right angle of the triangle to keep it in position with one of the fixing means.

2. The device according to claim 1, characterized in that the right angled triangle has first, second and third sides, the second side being a hypotenuse, in that the retaining means comprise eyelets forming small diameter rings dividing the flexible and inelastic material to form strands, the rings being fixed on the material at predetermined first, second and third fixing locations starting from one end of the material, a predetermined length of material remaining free beyond the third fixing location, and in that the fixing means are plugs, pegs or headless nails adapted to support the rings, the diameter of each plug, peg or headless nail being substantially equal to an inside diameter of the ring so that the material can be positioned along a direction perpendicular to the direction of the axis of the corresponding plug, peg or headless nail, the fixing locations of the rings on the material being chosen such that when the material is tensioned between the rings, the remaining length of the material is free to form a first end of the right angled triangle in which the hypotenuse and the third side are defined by the two distances between the first and second fixing locations and between the second and third fixing locations.

3. The device according to claim 2, characterized in that a fourth retaining means is fixed at the end of the predetermined length of material beyond the third location, so that it can be superposed on the first ring at the end of the material to form the first side of the triangle.

4. The device according to claim 2, characterized in that the rings are sized so that each ring fits on each plug, the diameter of which is substantially equal to the inside diameter of the ring, whereas an angular window is formed on the periphery of the plug, peg or headless nail delimiting an angular sector between the ring and the plug, peg or headless nail enabling positioning of the material in a direction perpendicular to the axis of the plug, peg or headless nail using a terminal loop of the material around the ring and penetrating into the sector.

5. The device according to claim 2, characterized in that the ring is circular and bears on a shoulder of the plug, peg or headless nail.

6. The device according to claim 2, characterized in that an axial hole is arranged in each plug, peg or headless nail to place it on a support.

7. The device according to claim 6, characterized in that the axial hole is prolonged by an axial reaming adapted to receive a headless nail to fix the plug, peg or headless nail on a hard surface.

8. The device according to claim 2, characterized in that the ring delimits a peripheral shape configured so as to define a characteristic angle or a right angle in the material.

9. The device according to claim 2, characterized in that at least two shoulders are formed on each plug, peg or headless nail forming concentric stages which can hold rings with dimensions corresponding to right angled triangles with different complementary angles, or with dimensions adapted to the application considered.

10. The device according to claim 2, characterized in that the at least three retaining means further comprise sets of rings with different colors and/or shapes, which are fixed to the material at appropriate locations, such that there is a right angled triangle with determined complementary dimensions and angles, for each different set of rings.

11. The device according to claim 2, characterized in that the at least three retaining means comprises a set of four rings and two rings with different diameters are fixed beyond the first four rings on the material at distances calculated so that it is possible to make a right angled triangle either with the first four rings with complementary angles of 30 degrees and 60 degrees, or using the first ring and the last three rings to form a right angled triangle with two complementary angles of 45 degrees each.

12. The device according to claim 1, characterized in that the flexible and inelastic material is wound on the housing, arranged in a loop.

13. The device according to claim 1, characterized in that two marks are made at the vertex of the right angle on the housing, materializing the alignment of the tensioned material.

14. The device according to claim 12, characterized in that the material is crimped to the winder at one of its ends, while the other end is crimped free to move around a pin fixed to one of the ends of the housing forming one of the sides of the right angle to form a material loop.

15. The device according to claim 12, characterized in that a window is located near the periphery of the housing through which the material passes and that is large enough to allow the eyelets to pass through when the device is being put into place.

16. The device according to claim 15, characterized in that the housing comprises a recess near the window, a pin being fixed in the recess to attach the third eyelet of each set.

17. The device according to claim 12, characterized in that the eyelets in each set are crimped on the material at distances such that when the device is in place, it defines a large right angled triangle.

18. The device according to claim 1, characterized in that it comprises three winders inside the housing being guided in rotation, the flexible and inelastic material being wound around these winders, at least two of the winders being mobile and able to completely come out of the housing in order to form the ends of the sides of the right angle of the housing, while the lengths of three portions of the flexible and inelastic material that connect the winders in pairs are calculated such that when they are tensioned and in contact with stops of the winders, they form a right angled triangle materialized both by the tensioned material and by the fixing means passing through the at least three retaining means fixed to the material.

19. The device according to claim 18, characterized in that a hole in each of the mobile winders holds them in position using the fixing means, which comprises plugs, headless nails or pegs.

20. The device according to claim 1, characterized in that the housing comprises a first straight edge and a second straight edge perpendicular to the first straight edge, the retaining means being crimped onto the material such that the outside diameter of the retaining means is in line with the said edges of the housing.

21. The device according to claim 18, characterized in that the mobile winders comprise an outside edge that is in line with the straight edges of the housing when it is in position.

* * * * *